United States Patent [19]

Shirasaki

[11] Patent Number: 4,609,257
[45] Date of Patent: Sep. 2, 1986

[54] FARADAY ROTATOR ASSEMBLY

[75] Inventor: Masataka Shirasaki, Kawasaki, Japan

[73] Assignee: Fujitsu Limited, Kawasaki, Japan

[21] Appl. No.: 603,188

[22] Filed: Apr. 23, 1984

[30] Foreign Application Priority Data

Apr. 25, 1983 [JP] Japan .................................. 58-071390
Apr. 25, 1983 [JP] Japan .................................. 58-071391

[51] Int. Cl.$^4$ ............................ G02F 1/09; G02B 6/10
[52] U.S. Cl. ..................................... 350/376; 350/355; 350/96.13
[58] Field of Search ............... 350/355, 374, 375, 376, 350/378, 384, 96.13, 389

[56] References Cited

U.S. PATENT DOCUMENTS 3,515,457  6/1970  Dillon, Jr. ........................... 350/375
4,355,864  10/1982  Soref .................................. 350/355

OTHER PUBLICATIONS

Applied Optics, vol. 21, No. 11, Jun., New York (US), M. Shirasaki et al.: "Bistable Magnetooptic Switch for Multimode Optical Fiber", pp. 1943–1949, *Abstract, FIGS. 3–8.
Applied Optics, vol. 21, No. 23, Dec. 1982, New York (US) M. Shirasaki et al.: "Nonmechanical Optical Switch for Single-Mode Fibers", pp. 4229–4234.

*Primary Examiner*—John K. Corbin
*Assistant Examiner*—B. S. Shapiro
*Attorney, Agent, or Firm*—Staas & Halsey

[57] ABSTRACT

A Faraday rotator assembly includes a Faraday rotator of an optically transparent magnetic material; a device for applying a first magnetic field to the Faraday rotator, which field saturates the Faraday rotator with reversible magnetization; and a device for applying a second magnetic field to the Faraday rotator, the field having a direction different from that of the device for applying the first magnetic field to the Faraday rotator. The magnetization in the Faraday rotator is maintained in a saturation state by the second magnetic field at least during the reversal of the direction of the first magnetic field. The angle of the Faraday rotation of the Faraday rotator is reversed by reversing the direction of the first magnetic field.

9 Claims, 21 Drawing Figures

Fig. 9A
Fig. 9B
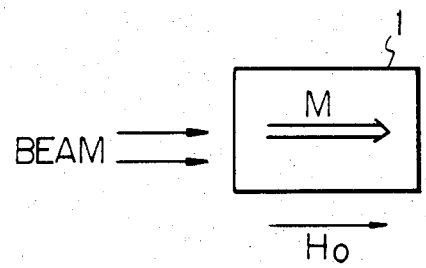
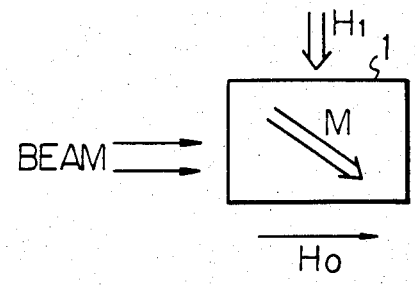
Fig. 9C
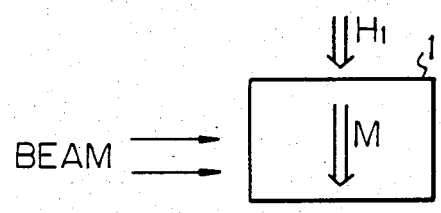
Fig. 9D
Fig. 9E
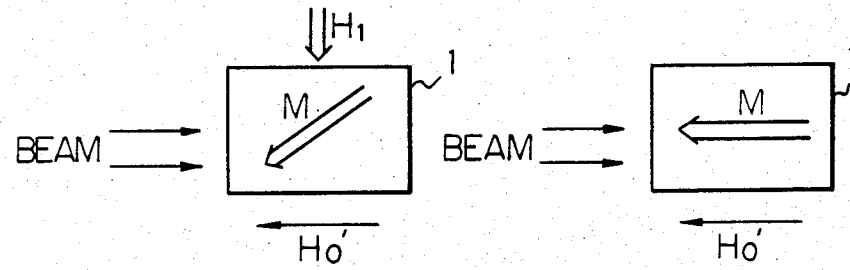

FARADAY ROTATOR ASSEMBLY

BACKGROUND OF THE INVENTION

The present invention relates to a Faraday rotator assembly, more particularly to a Faraday rotator assembly provided with means which can prevent irregular fluctuation of the magnetic domain in the Faraday rotator on reversing the direction of the Faraday rotation.

As is well known, Faraday rotators made of, for example, a single crystal of yttrium-iron-garnet (YIG) can be used in optical switches for optical communications since they enable effective selection of optical paths.

Such optical switches make use of the Faraday rotation of linearly polarized light passing through the Faraday rotator. The clockwise or counterclockwise direction of rotation due to the Faraday effect depends on whether the direction of the external magnetic field applied to the YIG is the same as or opposite to the direction of light travel, respectively. Therefore, to reverse the rotation due to the Faraday effect, the direction of the magnetic field applied to the YIG must be reversed.

The conventional means for reversing the direction of the magnetic field has the problem of irregular fluctuation of the magnetic domain in the Faraday rotator during the reversal. This results in dispersion of the light and unusual fluctuation of the output light intensity or level, thus obstructing effective optical communications.

SUMMARY OF THE INVENTION

It is an object of the present invention to provide a Faraday rotator assembly in which the output light intensity does not decrease during reversal of rotation due to the Faraday effect.

It is another object of the present invention to provide a Faraday rotator assembly in which saturation of magnetization is maintained so that irregular fluctuation of the magnetic domain in the Faraday rotator does not occur during reversal of rotation due to the Faraday effect.

According to the present invention, there is provided a Faraday rotator assembly comprising a Faraday rotator consisting of an optically transparent magnetic material; means for applying a first magnetic field to the Faraday rotator, which field saturates the Faraday rotator with reversible magnetization; and means for applying a second magnetic field to the Faraday rotator, the field having a direction different from that of the means for applying the first magnetic field to the Faraday rotator. In the invention, the magnetization in the Faraday rotator is maintained in a saturation state by the second magnetic field at least during the reversal of the direction of the first magnetic field. The angle of the Faraday rotation of the Faraday rotator is reversed by reversing the direction of the first magnetic field.

BRIEF DESCRIPTION OF THE DRAWINGS

Further objects and advantages of the present invention will be apparent from the following description made in reference to the accompanying drawings, in which:

FIGS. 9A to 9E are diagrams for explaining the reversal of direction of magnetization in the Faraday rotator of FIG. 8;

DESCRIPTION OF THE PREFERRED EMBODIMENTS

Before describing the preferred embodiments of the present invention, a more detailed explanation of the prior art will be given for reference purposes.

Figure 1:
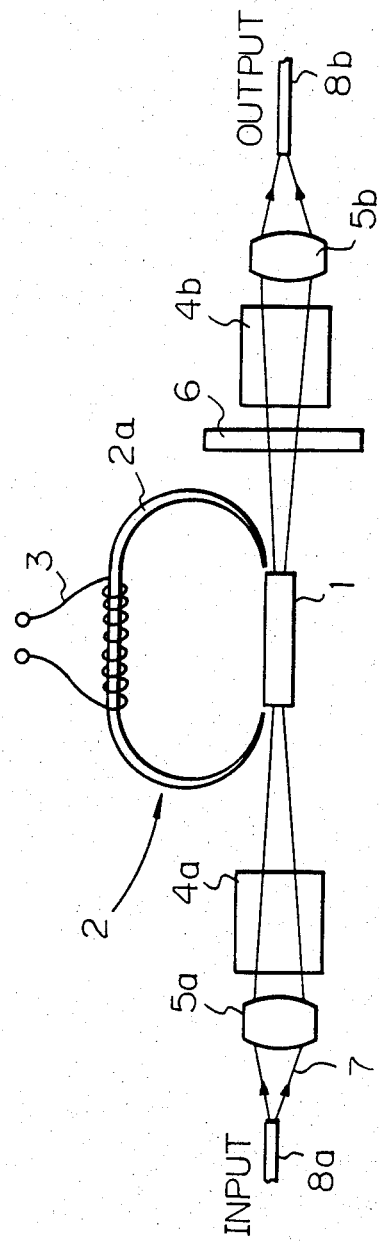
FIG. 1 is a side view of an optical switch comprised of a conventional Faraday rotator assembly.

FIG. 1 is a side view of an optical switch utilizing a conventional Faraday rotator assembly. As shown in FIG. 1, a conventional optical switch comprises a Faraday rotator 1 consisting of a YIG thin plate, an electromagnet 2 made of semi-hard magnetic material 2a and having a coil 3, polarizing prisms 4a and 4b, a half-wave plate 6, and lenses 5a and 5b. The Faraday rotator assembly per se consists of the Faraday rotator 1 and the electromagnet 2.

In the operation of the optical switch, beams 7 of light input from single-mode optical fibers 8a are passed through the lens 5a, the polarizing prism 4a, and the Faraday rotator 1, which is installed at the beam waist. The light is then led through the half-wave plate 6, the polarizing prism 4b, and the lens 5b to the single-mode optical fibers 8b for output.

Figure 2:
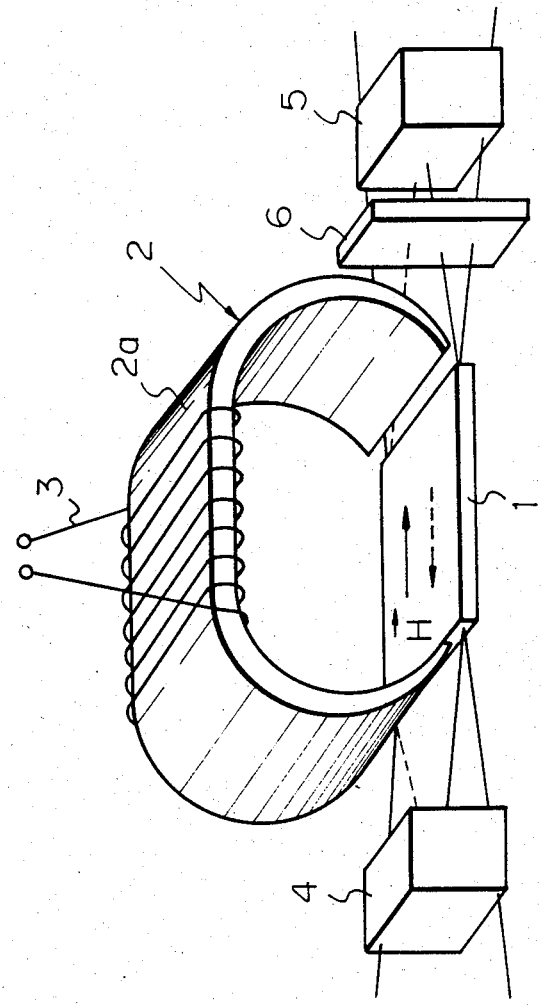
FIG. 2 is a perspective view for explaining a conventional Faraday rotator assembly.

FIG. 2 is a partially enlarged view of FIG. 1. In FIG. 2, the Faraday rotator 1 is magnetized by the electromagnet 2 in the direction shown by the arrow H. To switch the optical path, the magnetic field is reversed to change the direction of magnetization in the Faraday rotator 1 to that shown by the broken arrow.

Figure 3A:
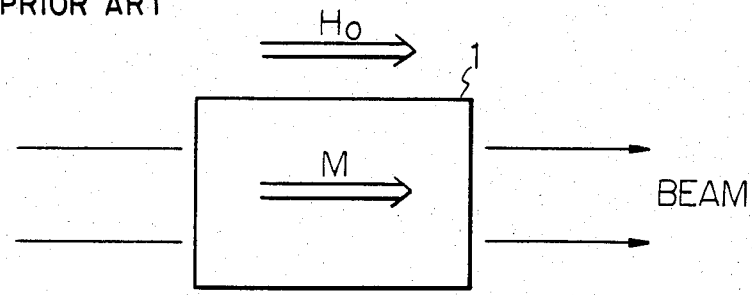
FIGS. 3A to 3C are diagrams for explaining conventional reversal of direction of magnetization in a Faraday rotator.
Figure 3B:
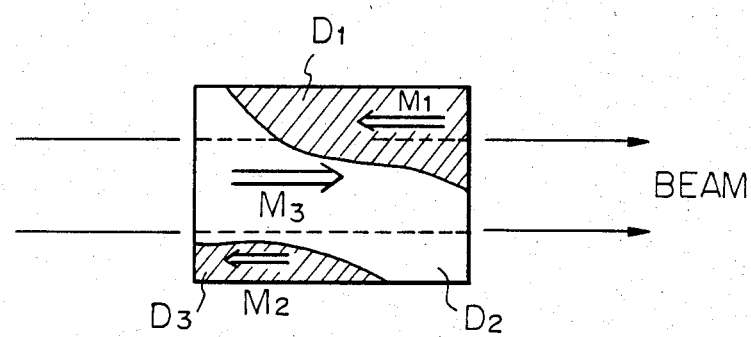
Figure 3C:
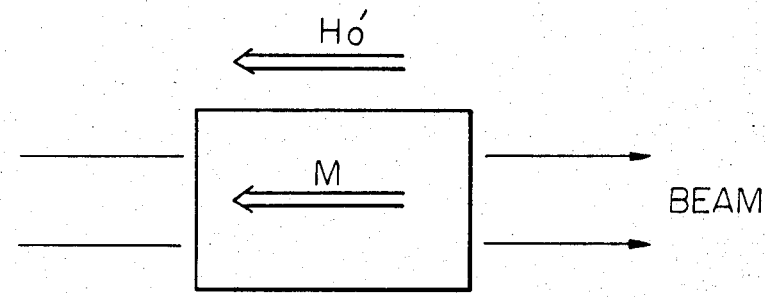

FIGS. 3A to 3C are diagrams for explaining the conventional reversal of direction of magnetization in a Faraday rotator. As shown in FIG. 3A, the magnetization M in the Faraday rotator is saturated by applying a magnetic field $H_o$. As explained above, to switch the optical path, the magnetic field is reversed to change the direction of magnetization in the Faraday rotator, thereby obtaining the state shown in FIG. 3C. The magnetic field $H'_o$ applied to the Faraday rotator is substantially the same as the magnetic field $H_o$ saturated in the Faraday rotator 1 before the switching.

During the reversal of direction of magnetization in the Faraday rotator, however, there is an instant wherein the total magnetization in the Faraday rotator is substantially zero. As shown in FIG. 3B, there is an instant where there are three magnetizations M1, M2, and M3 (M1+M2=M3) in magnetic domains D1, D2, and D3. This substantially zero magnetization results in a momentarily decreased light beam intensity and reduces the reliability of optical communications.

Figure 4:
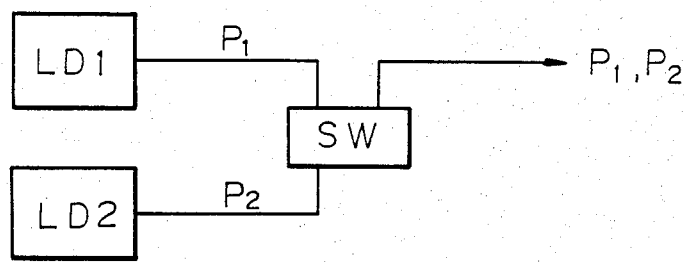
FIG. 4 is a block view of an optical switch connected to light sources.
Figure 5A:
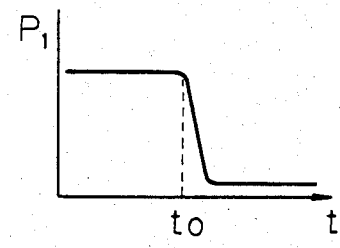
FIGS. 5A to 5C are graphs of the relationship between light intensity and time.
Figure 5B:
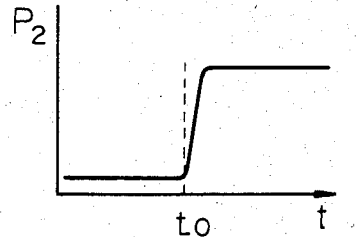
Figure 5C:
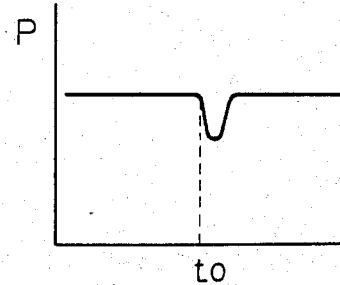

FIG. 4 is a block view of an optical switch (SM) connected to light sources, e.g., laser diodes LD1 and LD2. FIGS. 5A to 5C are graphs of the relationships between the light intensity P and time t. An explanation will be given of the change from the operation of the laser diode LD1 to the operation of the laser diode LD2 by using the optical switch (SW) in reference to these figures.

Assume the laser diode LD1 is first operated with a light intensity P1 through the optical switch SW. Operation of the optical switch SW stops the operation of the laser diode LD1 and starts the operation of the laser diode LD2 with a light intensity P2. FIG. 5A shows the relationship between the light intensity P1 and time in the laser diode LD1, and FIG. 5B shows the relationship between the light intensity P2 and time in the laser diode LD2. The time t0 in FIGS. 5A and 5B corresponds to the start of switching by the optical switch SW.

Figure 6:
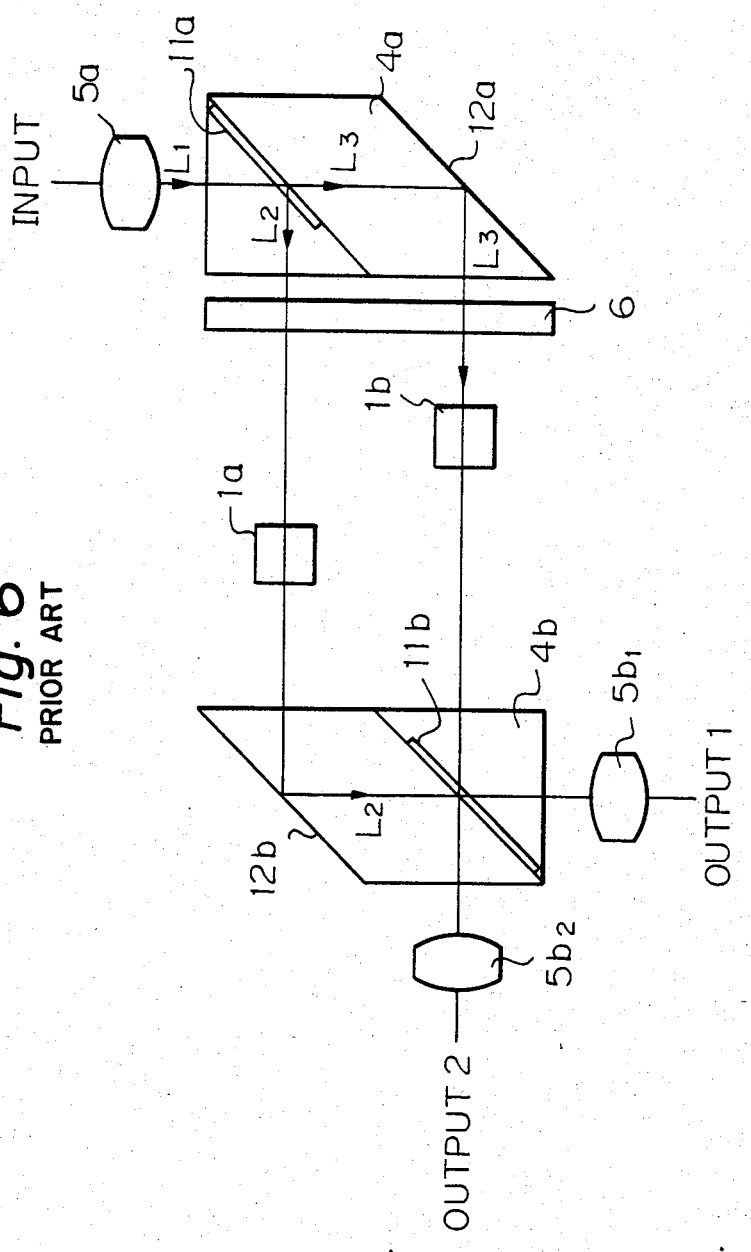
FIG. 6 is a top view of an optical switch comprising two Faraday rotators.
Figure 7:
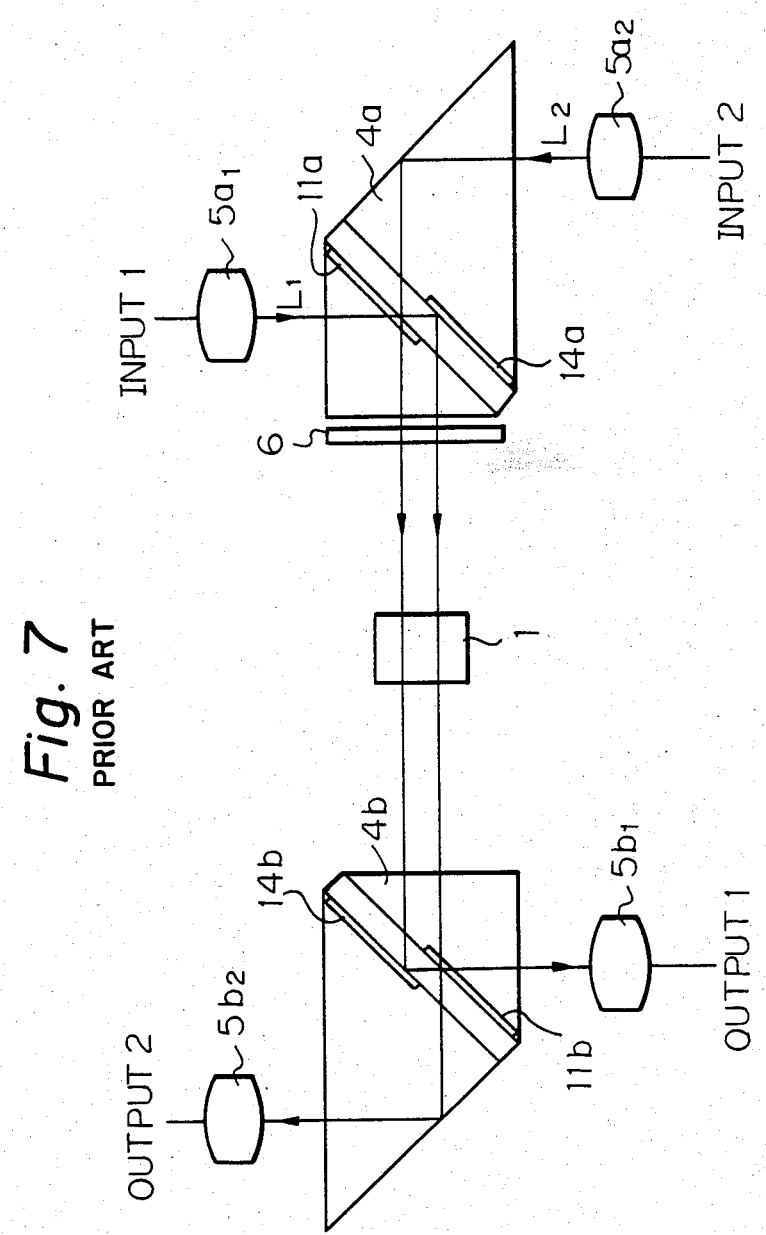
FIG. 7 is a top view of an optical switch comprising one Faraday rotator.

As shown in FIG. 5C, due to the above-mentioned instant of substantially zero magnetization, when using the optical switch SW to change from the laser diode LD1 to the laser diode LD2, the light intensity is decreased for an instant from the time t0. FIGS. 6 and 7 show optical switches respectively comprising two and one Faraday rotators with magnets (not shown). Referring to FIG. 6, a light beam L1 emitted from the input fibers (not shown) through the lens 5a is separated at the joint of the polarizing prism 4a by a multilayer interference film 11a.

A light beam L2 separated as S polarization by the multi-layer interference film 11a is passed through a YIG thin plate Faraday rotator 1a, reflected at a surface of a polarizing prism 4b, separated at the joint of the polarizing prism 4b by a multilayer interference film 11b, and led to the output fibers (not shown) through the lenses 5b1 and 5b2.

On the other hand, a light beam L3 separated as P polarization by the multilayer interference film 11a is reflected at the surface 12a of the polarizing prism 4a and is passed through a YIG thin plate Faraday rotator 1b, separated at the joint of the polarizing prism 4b by the multilayer interference film 11b, and led to the output fibers through the lenses 5b1 and 5b2. In the above process, light passed through the Faraday rotators is resynthesized by the polarizing prism 4b.

In the setup shown in FIG. 6, the process of resynthesizing light after polarization separation to lead it to the input fibers requires critical accuracy in prism dimensioning and angularity. Obtaining such good accuracy, however, is extremely difficult both technically and economically. Thus, conventionally, the two Faraday rotators are combined into one.

FIG. 7 shows a two-input/two-output optical switch using a single Faraday rotator. In FIG. 7, reference numerals 14a and 14b represent reflection films consisting of alternate layers of, for example, SiO₂ and TiO₂. Even with this optical switch, however, the above-mentioned problem occurs.

Figure 8:
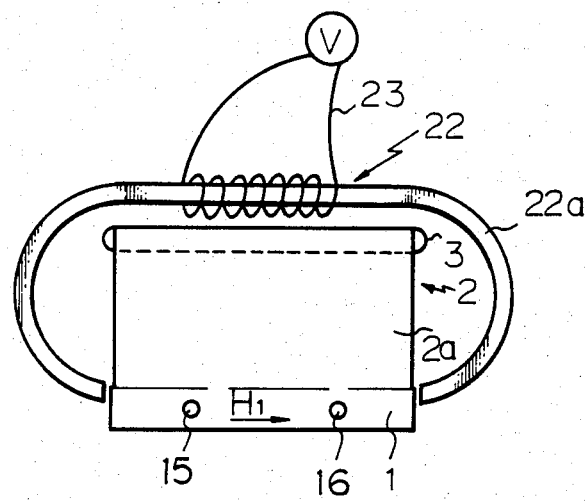
FIG. 8 is a side view of an embodiment of the Faraday rotator assembly according to the present invention.

FIG. 8 is a side view of an embodiment of the Faraday rotator assembly according to the present invention. As shown in FIG. 8, the Faraday rotator assembly comprises: a YIG thin plate Faraday rotator 1, through which two light beams 15 and 16 are passed in a direction perpendicular with respect to the plane of the sheet of FIG. 8; an electromagnet 2 using, for example, a semi-hard magnetic material 2a as a core and provided with a coil 3, which reverses the angle of the Faraday rotation of the Faraday rotator 1 by applying a reversed magnetic field in the Faraday rotator 1; and an electromagnet 22 using, for example, a magnetic material 22a such as permalloy or soft-iron as a core and with a coil 23, which maintains the magnetization in the Faraday rotator 1 in a saturation state during reversal of direction of the magnetic field applied to the Faraday rotator 1 by the electromagnet 2. The magnetic flux generated by the electromagnets 2 and 22 are closed through the Faraday rotator 1.

The coil 3 is connected to the coil 23 in series or in parallel. A 45° Faraday rotator is preferably used. A 2.1 mm long YIG thin plate is needed to obtain 45° Faraday rotation at 1.3 um wavelength.

In operation, a magnetic field is applied to the Faraday rotator 1 in the light passing direction by the electromagnet 2. Then, another magnetic field H1 great enough to maintain the magnetization in the Faraday rotator 1 at a saturation state is applied by the electromagnet 22 in a direction perpendicular to the light passing direction. The electromagnet 2 then applies a magnetic field in the opposite direction to the light passing direction. As a result, the angle of the Faraday rotation of the Faraday rotator 1 is reversed while the magnetization in the Faraday rotator 1 is saturated.

Then, the magnetic field H1 applied by the electromagnet 22 in the direction penpendicular to the light passing direction is removed. Namely, referring to FIGS. 9A to 9E, the magnetization M in the Faraday rotator 1 as shown in FIG. 9A is reversed while maintaining the saturation state as shown in FIGS. 9B, 9C, and 9D in the magnetization in the Faraday rotator 1 as shown in FIG. 9E. Thus, abnormal fluctuation in the light intensity or level can be prevented during reversal of the magnetization M.

Figure 10:
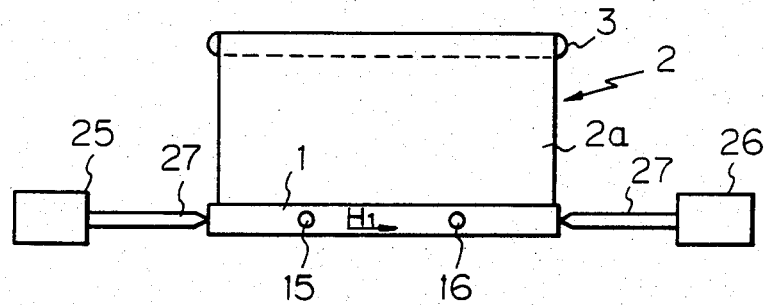
FIG. 10 is a side view of another embodiment of the Faraday rotator according to the present invention.

FIG. 10 is a side view of another embodiment of the Faraday rotator assembly according to the present invention. In FIG. 10, instead of the electromagnet 22 shown in FIG. 8, permanent magnets 25 and 26 are used. The permanent magnets 25 and 26, consisting of, for example, samarium-cobalt, are provided horizontally at opposite ends of the Faraday rotator 1. The permanent magnets 25 and 26 are provided with guides 27 made of magnetic material such as permalloy or soft-iron to apply a magnetic field H1 to the Faraday rotator 1 in a direction perpendicular to the light passing direction. The operation of the embodiment shown in FIG. 10 is substantially the same as that in FIG. 8.

Figure 11A:
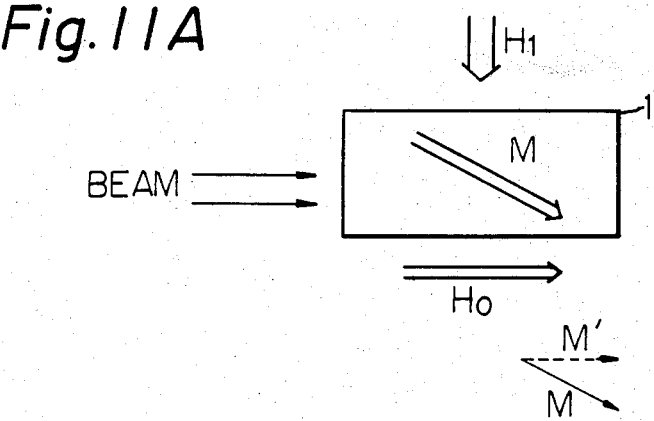
FIGS. 11A to 11C are diagrams for explaining the reversal of direction of magnetization in the Faraday rotator of FIG. 10.
Figure 11B:
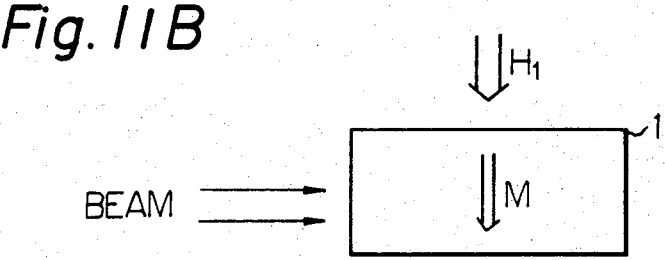
Figure 11C:
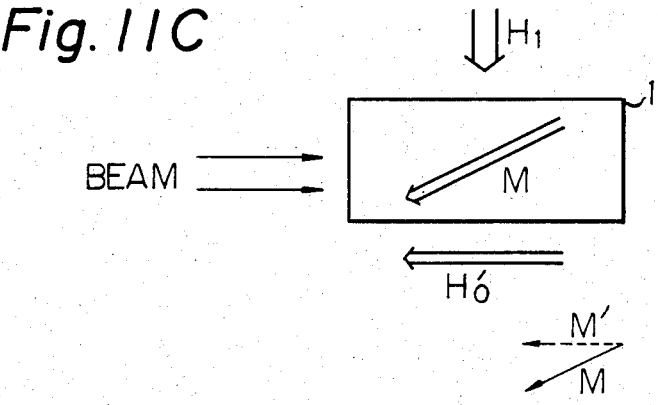

FIGS. 11A to 11C are diagrams for explaining the reversal of direction of magnetization in the Faraday rotator of FIG. 10. As shown in FIGS. 11A to 11C, the magnetization M in the Faraday rotator 1 is reversed while being saturated by application of the magnetic field H1 to the Faraday rotator 1 by the permanent magnets 25 and 26. In the case where permanent magnets are used, the magnetization is generated in a sloped direction. Thus, if the magnetization M' is needed, the magnetization M must be generated as shown in 11A.

According to the present invention, it is preferable that the magnetic field applied by the electromagnets 2, 22, and the like be 100 to 150 Oe. The YIG thin plate is preferably about 200 μm thick.

I claim:

1. A Faraday rotator assembly comprising:

a thin plate Faraday rotator formed of an optically transparent magnetic material and arranged for passing light beams along a path in a first direction parallel to said thin plate;

means for applying a first magnetic field in said first direction to the thin plate Faraday rotator, which field saturates the thin plate Faraday rotator along said path with reversible magnetization; and means for applying a second magnetic field to said thin plate Faraday rotator in a second direction that is parallel to said thin plate Faraday rotator and perpendicular to said first direction;

wherein the angle of Faraday rotation of the thin plate Faraday rotator is reversed by reversing the direction of the first magnetic field, and the magnetization of the thin plate Faraday rotator is maintained in a saturation state by the second magnetic field at least during the reversing of the direction of the first magnetic field.

2. A Faraday rotator assembly according to claim 1, wherein said thin plate Faraday rotator is of yttrium-iron-garnet.

3. A Faraday rotator assembly according to claim 1, wherein said thin plate Faraday rotator is a 45° Faraday rotator.

4. A Faraday rotator assembly according to claim 1, wherein said first magnetic field applying means is formed by an electromagnet formed of semi-hard magnetic material.

5. A Faraday rotator assembly according to claim 1, wherein said second magnetic field applying means comprises an electromagnet formed of a soft magnetic material and a coil.

6. A Faraday rotator assembly according to claim 5, wherein said soft magnetic material is permalloy or soft iron.

7. A Faraday rotator assembly according to claim 1, wherein said second magnetic field applying means comprises a predetermined one of permanent magnets and a soft magnetic material.

8. A Faraday rotator assembly according to claim 1, wherein said first and second magnetic fields are in the range from 100 to 150 oersted.

9. A Faraday rotator assembly according to claim 1, wherein the thickness of said thin plates Faraday rotator is about 200 $\mu m$.

* * * * *

UNITED STATES PATENT AND TRADEMARK OFFICE
CERTIFICATE OF CORRECTION

PATENT NO. : 4,609,257
DATED : 2 September 1986
INVENTOR(S) : MASATAKA SHIRASAKI It is certified that error appears in the above-identified patent and that said Letters Patent is hereby corrected as shown below:

* Figs. 3B AND Figs. 3C should also be labeled as "PRIOR ART".

Col. 1, line 47, after "comprising" insert --:--.

Col. 3, line 5, "(SM)" should be --(SW)--.

* Col. 6, line 23, "plates" should be --plate--.

Signed and Sealed this

Twenty-third Day of December, 1986

*Attest:*

DONALD J. QUIGG

*Attesting Officer*    *Commissioner of Patents and Trademarks*